United States Patent [19]

Vickery et al.

[11] Patent Number: 5,777,455
[45] Date of Patent: Jul. 7, 1998

[54] SWITCH FOR A BATTERY CHARGING SYSTEM

[75] Inventors: Paul Gary Vickery; Iain Wallace Waugh, both of Hamilton, New Zealand

[73] Assignee: Glorywin International Group Limited

[21] Appl. No.: 587,371

[22] Filed: Jan. 16, 1996

[30] Foreign Application Priority Data

Jan. 16, 1995 [NZ] New Zealand .................. 270 344

[51] Int. Cl.$^6$ ........................................... H01M 10/46
[52] U.S. Cl. ................................ 320/104; 320/132
[58] Field of Search ............................. 320/103, 104, 320/117, 118, 123, 125, 132, 134, 141, 145, 108, 111, 112, 113, 115, 148; 307/10.1, 10.6, 19, 44, 46, 48

[56] References Cited

U.S. PATENT DOCUMENTS 5,175,484  12/1992  Witehira et al. ............... 320/125
5,225,761   7/1993  Albright ......................... 320/117
5,488,283   1/1996  Dougherty et al. ............. 307/10.1

FOREIGN PATENT DOCUMENTS 0 448 064   9/1991   European Pat. Off. .
3717716    10/1982   Germany .
4306510     8/1994   Germany .
 631118     7/1982   Switzerland .

Primary Examiner—Edward Tso
Attorney, Agent, or Firm—Seidel, Gonda, Lavorgna & Monaco, PC

[57] ABSTRACT

The present invention provides a switch for a battery charging system for a motorized vehicle including a starter motor, a battery with a CRA part and an AUX part, and a battery charging generator wherein the switch includes a series connector between the CRA and AUX parts and a sensor which senses at least a state of charge of the CRA part and prioritizes the generator current to the CRA part through the series connector.

14 Claims, 1 Drawing Sheet

SWITCH FOR A BATTERY CHARGING SYSTEM

TECHNICAL FIELD

This invention concerns battery charging systems for boats and vehicles, in particular where the battery contains two series of cells in parallel or where two batteries are mutually connected in series.

A 3-pole battery consists of two series of cells with a common negative terminal. One positive terminal of the battery is designated for providing power for cranking the engine (CRA). The other terminal is designated for providing power to the auxiliaries (AUX).

In preferred connections the starting, ignition and charging circuits are connected between the positive and negative of the CRA battery. All other electrical loads are connected between the positive and negative of the other AUX battery.

BACKGROUND ART

When 3-pole batteries were introduced for marine use in the expectation of improved electric starting for boat engines, failures still sometimes occurred. The alternator was wired to charge both the CRA and the AUX battery even though one of the parts of the battery, usually the AUX battery, was discharged more quickly than the other due to the operation of winches and radios.

The CRA battery was dedicated to the essential operation of starting whereas the AUX battery served non-essential equipment. The CRA battery must remain fully charged but if no charging current reaches the AUX battery the user may be disadvantaged.

The CRA battery may be connected to the AUX battery by a switch such that connection occurs whenever the voltage exceeds a preset value and disconnection occurs whenever the voltage falls below the value. This algorithm will be ineffective if the CRA battery is appreciably charged, the AUX battery is partially charged and the generator current is low because the switch will oscillate at high frequency.

My early switches (in Australian patent application #47641/93 and U.S. patent application Ser. No. 08/379,631) employed relays which opened and closed in response to microprocessor instructions. These instructions were generated by continual monitoring of the battery condition and the various loads by the microprocessor. CRA and AUX battery voltage and current values enabled the microprocessor to initiate charging and to prevent overcharging just by suitable relay operation, even though the options were limited to CHARGE/NO CHARGE.

In my copending application for NZ patent no 264 225 the options improved in that the switch was opened and closed in response to more suitable information. The state of charge value upon which the microprocessor acted to open/close the relay had been more carefully assessed and now depended also on available current flow.

This allowed the microprocessor to be instructed to select at the alternator, a charging current of a magnitude appropriate to the battery's discharged state. While the latter advance is useful it still may leave the CRA battery receiving a float charge when it urgently requires maximum charge.

This is important where outboard motors are served by the type of battery referred to above. Such batteries need microprocessor control that will prioritise the charging current to the CRA battery in order to assure the boat occupant that the motor will start. This requirement applies equally to a battery with two positive poles and two negative poles or pairs of conventional batteries. A relay cannot provide this refinement for various reasons.

1 The motor alternator may generate from 5–70 A depending on its size. The auxiliary loads may vary between 0–150 A depending on what accessories are fitted and which are in use. The AUX battery is regularly depleted by ignition, radio and winch operation. If a relay were in series between CRA and AUX batteries the microprocessor would frequently connect them and the CRA battery charge would fall below guaranteed start capacity.

2 When the motor starts, CRA volts fall to 7 to 8 volts. If the AUX battery is reasonably charged the microprocessor will close the relay and allow the AUX battery to assist. But motor start currents may rise to 1–200 A, too large for the installed relay which normally carries 30 A.

Preferably the series connector should have low power consumption because it is driven by the CRA battery; it should pass 30 A while dropping little voltage; it must be capable of withstanding reversal in polarity of its input and output such as described above; it must drop little voltage during charging otherwise a sufficient heat sink must be built in.

A MOSFET connector is not useful because the parasitic reverse diode property means that the device would conduct current from AUX to CRA during starting. The operational currents in a vehicle or boat battery would exceed 100 A and this is well above the current capability of present MOSFETS. Thus the device would fail. A MOSFET could be used in this type of application if a relay were connected in series with the device. Thus if a large current was detected the relay would open and prevent damage to the relay.

In U.S. Pat. No. 5,264,777 a pair of batteries are mutually connected in order to be charged together but disconnected in order to discharge separately. Such selective connection is achieved by an electronic switch and a microprocessor however there is no indication concerning the unequal apportionment of current.

EP 398 691 discloses a battery switch for auto use wherein loads are disconnected and the two parts of the battery are connected for simultaneous charging but both parts receive equal charge and the enhanced charging of the CRA part is not disclosed.

This invention addresses the problem.

SUMMARY OF THE INVENTION

This invention provides a 3- or 4-pole battery switch for a boat or vehicle with a starter motor, a battery with CRA and AUX parts and a battery charging generator wherein the switch has sensing means which senses at least the state of charge of the CRA battery and prioritises the supply of charging current to the CRA battery through a series connector between the CRA and AUX batteries.

The sensing means may split the charging current at the series connector directing the major current to the CRA battery and the minor current through the AUX battery. As the CRA charge improves the supply reverses and the AUX battery receives the major current. Finally the sensing means opens the series connector to prevent overcharging.

The sensing means may be a microprocessor. The series connector may be a solid state switch. The solid state switch may be cancelled temporarily by an interrupter actuated by the motor start in order to protect the switch against reverse polarity during starting. The interrupter may be a relay driven by a MOTOR START detector circuit.

The sensing means may sense the state of charge of the AUX battery and direct surplus current to the AUX battery.

The state of charge assessment by the microprocessor is important to the success of the procedure which may continue for the life of the battery.

BRIEF DESCRIPTION OF THE DRAWINGS

One embodiment of the invention is now described with reference to the accompanying drawings in which.

BEST MODE OF CARRYING OUT THE INVENTION

Figure 1:
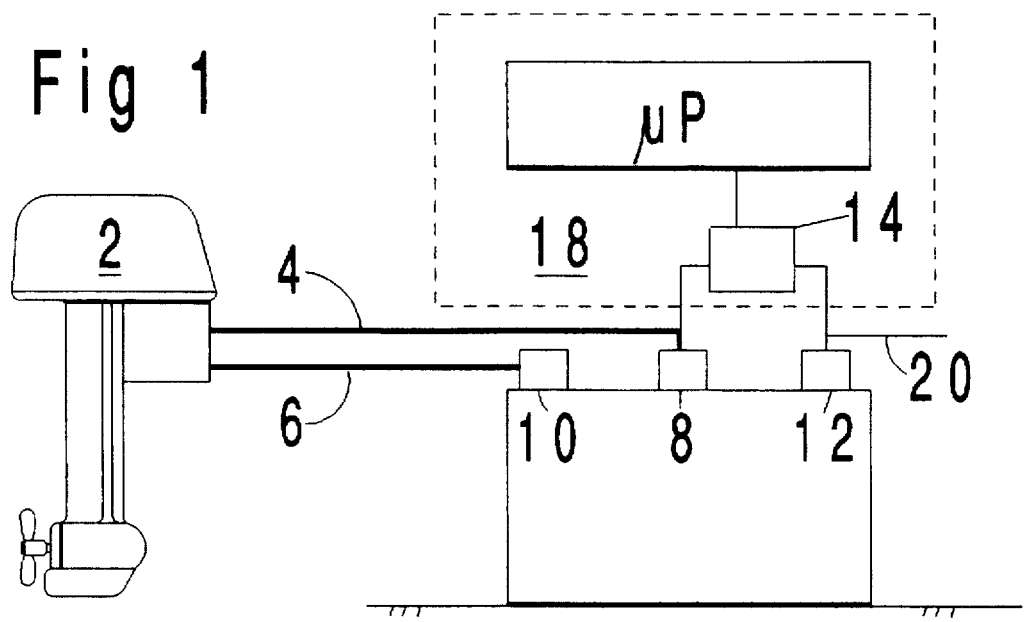
FIG. 1 is a block schematic of the outboard.

The starter motor (not shown) of outboard motor 2 receives a large START current through leads 4 and 6 from the CRA pole 8 and the −ve pole 10. The CRA pole 8 is connected to the AUX pole 12 by the series connector 14. The series connector 14 is controlled by the microprocessor μP. Components 14 and μP are accommodated on a small circuit board 18 comprising the switch. Charging current reaches AUX 12 via conductor 20.

Figure 2:
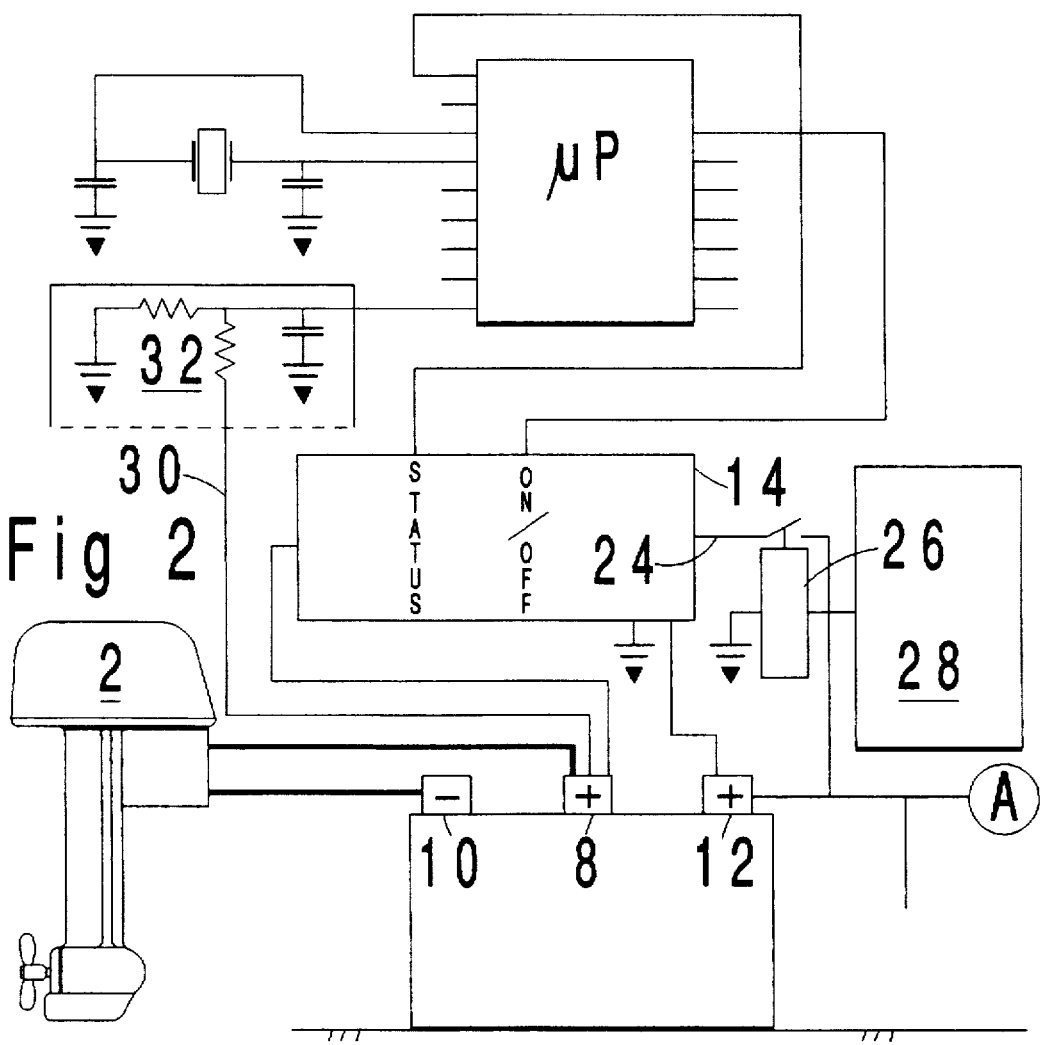
FIG. 2 shows FIG. 2 in greater detail.

Referring now to FIG. 2 the series connector is a solid state device UN 30 H which connects poles 8,12 through leads 22,24. A solid state connector 14 is made inoperative by a relay 26 connected to lead 24 and driven by a MOTOR START detector 28.

This is a piezo device which signals the relay to open so long as the MOTOR START condition induces a reverse polarity which could damage the series connector 14. Lead 30 supplies available CRA volts to a voltage input conditioner 32.

A CRA volts value reaches microprocessor μP which varies the proportion of current supplied to the AUX pole by modulating pulse width at the ON/OFF pin in the solid state switch.

The switch works as follows:

If the available CRA volts are reported to the μP as less than 13.8v the P processes two possibilities.

1 the motor is still and so there is no charging current available. The CRA battery should be at about 12.6v.

2 The motor is running but the charge current is not sufficient to keep the CRA battery at 13.8v.

In both situations the μP will cause the switch 14 to reduce the current to the AUX battery and divert the balance to the CRA battery. If the motor is not running as in 1 the switch will allow no current to reach the AUX battery from the alternator. This in effect disconnects the AUX and CRA batteries. Thus no AUX loads can discharge the CRA battery and START capability is preserved.

If the motor is running, the switch is instructed to reduce the current to the AUX battery until the CRA volts are reported at 13.8v. Once the CRA volts are detected at 13.8v the switch diverts current to the AUX battery.

To further exemplify, if the alternator is generating 15 A, then keeping the CRA battery at 13.8v needs 5 A. 10 A therefore, are available to the AUX battery. As the CRA battery increases its charge level, it needs less current to keep it at 13.8v. After 5 min the current needed to keep the CRA battery at 13.8v may only be 2 A leaving 13 A free to charge the AUX battery.

This situation continues until the CRA cells need only a float current to stay at 13.8v. This current may be 0.25 A so 14.75 A is available to the AUX battery.

In the second embodiment the charging system and the critical loads are connected to the CRA battery. Other non critical loads are connected to the AUX battery. The connector is a 70 A relay which can connect or disconnect the Positive terminal of the CRA battery to the positive terminal of the AUX cells. An electronic switch controls the relays operation. The purpose of the switch is to preferentially charge the CRA battery and allow current to charge the AUX battery when there is a surplus output from the alternator.

When the CRA battery voltage is low (<13.0v) indicating that the battery is not being charged or if being charged the state of charge is low, the relay will remain open. When the battery voltage is high (>13.8v) the relay connects allowing the AUX battery to charge. After the relay closes one of three states may occur.

1 The AUX volts may initially rise higher than 13.0v indicating that the state of charge is high and the generator output exceeds the current draw of the auxiliaries. The relay remains connected.

2 The AUX volts initially rise then fall due to the parallel connection with the CRA battery. The AUX volts may fall as low as 10v however within 20 sec the AUX volts begin to rise. This indicates that although the AUX battery is appreciably discharged, the output of the charging system is greater than the current draw of the charging system. As long as the AUX volts is detected as rising at a minimum rate or reaches a value greater than 13.0v the relay remains connected.

3 The AUX volts initially rise then fall due to the parallel connection with the CRA battery, then will fall possibly and continue to fall indicating that the auxiliary loads exceed the output of the charging system. If the relay remains connected the CRA battery may discharge unacceptably. The relay opens and remains open for a preset period before reconnecting.

In this way the CRA battery charging is prioritised over the AUX battery.

We claim:

1. A switch for a battery charging system for a motorized vehicle including a starter motor, a battery with a CRA part and an AUX part, and a battery charging generator, the switch comprising:
   - a series connector between the CRA and AUX parts; and
   - a sensing means which senses at least a state of charge of the CRA part and prioritizes the generator current to the CRA part through the series connector.

2. A switch as in claim 1, wherein the series connector comprises a solid state switch.

3. A switch as in claim 2, wherein the solid state switch applies charging in appropriate proportions of generator current to the CRA and AUX parts dependent upon the state of charge of the CRA part as sensed by the sensing means.

4. A switch as in claim 3, wherein the sensing means is a microprocessor.

5. A switch as in claim 1, wherein the series connector includes a pulse generator and a pulse width modulator controlled by a microprocessor for varying the current between the CRA and AUX parts.

6. A switch as in claim 1, wherein the generator current to the CRA part varies between 0.25 A and 1.47 A.

7. A switch as in claim 3, wherein the series connector is connected to the generator via an interrupter and the interrupter is activated by a sensor responsive to vehicle motion.

8. A switch as in claim 7, wherein the interrupter is activated by operation of the starter motor.

9. A switch as in claim 7, wherein the vehicle motion is detected by a piezoelectric device.

10. A switch as in claim 3, wherein the sensing means senses the state of charge of the CRA part by a voltage input conditioner.

11. A switch as in claim 3, wherein the CRA part is connected to the starter motor, a vehicle ignition, and the generator and the AUX part is connected to electrical loads, wherein the sensing means connects the series connector when the sensed voltage exceeds a predetermined threshold and disconnects the series connector when the threshold is not reached.

12. A switch as in claim 11, wherein the sensing means closes the series connector for a preset period before opening.

13. A switch as in claim 11, wherein the sensing means opens the series connector for a preset period before closing.

14. A switch as in claim 11, wherein the AUX and CRA parts are in a single container.

* * * * *